May 17, 1938.  L. LEITZ  2,117,734
EXPOSURE METER
Filed Dec. 7, 1935
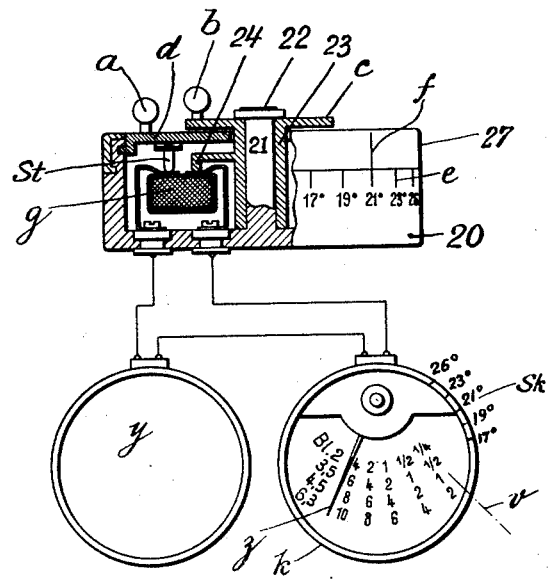
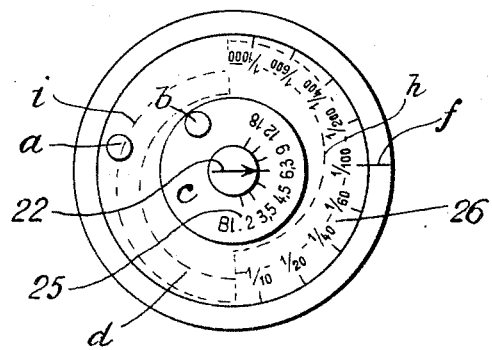
Ludwig Leitz
INVENTOR
BY
ATTORNEY Patented May 17, 1938

2,117,734

UNITED STATES PATENT OFFICE 2,117,734

EXPOSURE METER

Ludwig Leitz, Wetzlar, Germany, assignor to Ernst Leitz, G. m. b. H., Wetzlar, Germany Application December 7, 1935, Serial No. 53,313

3 Claims. (Cl. 88—23)

This invention relates to exposure meters. The object of the invention is to provide a generally improved exposure meter embodying certain novel features of construction and operation whereby to produce a more efficient apparatus capable of performing certain new operations and accomplishing certain results not possible to be performed by prior art devices. The objects and features of the invention will be pointed out hereinafter in greater detail and will be better understood after first considering the construction and operation of the device. The invention is embodied in an exposure meter constructed and operated as hereinafter set forth and as illustrated in the accompanying drawing in which Fig. 1 is a view of an exposure meter embodying the invention. This figure is largely diagrammatic and shows some parts in section with parts broken away.

Fig. 2 is a top view of the exposure meter shown in Figure 1.

Referring to Figures 1 and 2 the reference numeral 20 designates the casing of the device having a centrally fixed upright post 21. The latter carries on the top a fixed index mark 22. The post is surrounded by a sleeve 23 which carries a contact 24 and a disk c bearing a scale 25 indicating diaphragm openings ranging from two to eighteen. The disk is operated by a knob b. Immediately beneath the scale disk c there is another disk d rotatably mounted in the casing. The disk d bears a time exposure scale 26 ranging from 1/10 to 1/1000 and is operated by a knob a. Disk d carries a contact St. The two contacts 24 and St travel on two curved lamellae h and i, see Figure 2, electrically connected in a known manner to an annular resistance g which is connected in series with a photronic cell y and a galvanometer k or similar electrical measuring instrument. The lower portion of the outside of the casing 20 carries a Scheiner or similar scale e and a ring 27 is rotatably mounted to indicate the sensitiveness of the film by an index mark f, which extends from the side as in Fig. 1 to in over the top as in Fig. 2.

The galvanometer has a needle z adapted to mover over a dial bearing a scale in which the figures "2" to "6,3" indicate diaphragm openings and the other figures indicate corresponding time exposures for longer exposures as will be explained hereinafter. The operation of the exposure meter will be understood from the following examples.

First.—Let it be assumed that the film has a Scheiner index of twenty-one degrees and the photographer has decided to use the 6,3 diaphragm opening. He now desires to use the exposure meter to inform him how long the film must be exposed under the prevailing light conditions. He therefore first sets the Scheiner scale at "21°" in registry with the mark f and then rotates the disk c by means of the knob b until the figure 6,3 in the diaphragm opening scale 25 is brought into registry with the fixed mark 22. Thereafter he points the exposure meter towards the object to be photographed and commences to rotate the time exposure scale disk d by means of the knob a at the same time observing the galvanometer needle until it stops, in this example, in the position v which represents the largest readable movement of the galvanometer needle across the face of the instrument. When the needle reaches this position, the photographer stops the movement of the disk d and it will then be found that the figure 1/100 will be in line with the mark f. In other words the exposure scale d informs the operator that 1/100 of a second is the correct exposure for an opening of 6,3 with a Scheiner index of 21°.

From the foregoing example it will be seen that the photographer sets the diaphragm opening scale at the selected diaphragm opening figure and then operates the exposure scale in accordance with the prevailing light value as indicated by the galvanometer until the needle z stops and the exposure scale then automatically indicates the correct time exposure. This is a feature of this invention and one of its objects.

Second.—Let it be assumed that the photographer has decided to use a time exposure of 1/100 of a second and wants to know which diaphragm opening to use. This time he first sets the disk d until the figure 1/100 in the time exposure scale 26 is opposite the mark f. He then again exposes the device and operates the disk c again observing the needle z. When the needle reaches the end of its movement indicated by the position v, the operator stops the rotation of disk c and then finds that the figure "6,3" is opposite the mark 22. Consequently he sets his diaphragm opening at 6,3.

Attention is called to a feature of the invention with reference to the two scales 25 and 26. On the diaphragm opening scale 25 the lowest value is two and the highest value is eighteen. On the exposure scale 26 the slowest speed indication is 1/10 and the highest is 1/1000. As it happens, when the diaphragm is set to value eighteen, the required time of exposure is approximately one hundred times as long as that required for a diaphragm value of two. Consequently the exposure scale and the diaphragm scale cover approximately the same range.

Third.—Let it be assumed that the photographer wishes to take a picture under unfavorable light conditions but he hopes to use a diaphragm opening of 6,3. He then operates the diaphragm opening scale disk c and sets the figure 6,3 opposite the mark 22. He then operates the time exposure scale disk d at the same time observing the pointer on the galvanometer dial. He discovers however, that when he has completed the rotation of the disk d, i. e. when the figure "1/10" is opposite the Scheiner index mark f, the pointer z has not yet moved completely across the galvanometer dial because of the prevailing light conditions. The pointer z may for instance stop opposite the figure "4" in the outer circle of the time exposure scale on the face of the galvanometer. At the extreme left end of this circle appears the figure "6,3". Hence the galvanometer dial informs the photographer that if he leaves his diaphragm opening at 6,3, he must expose four seconds. Automatically the dial also reads that if he uses a diaphragm opening of 4,5, then he must expose two seconds. If the diaphragm opening is 3,5, the time exposure is one second and with an opening of "2", the exposure is one half second.

From this example it will be clear that the galvanometer dial serves for readings of longer time exposures under unfavorable light conditions when the other exposure and opening scales 26 and 25 fail.

It should further be noted that the galvanometer is provided with a Scheiner scale Sk which may be set for higher Scheiner indexes.

The operation, relation and function of a variable resistance with a photronic or photoelectric cell and a galvanometer is well known in the art and requires no detailed description. The resistance g is varied as the contacts 24 and St travel on the lamellae i and h which serve both as electrically connecting members as well as protecting means against scratching and wear of the resistance.

The foregoing is believed to fully describe the invention and the operation thereof as well as its objects and advantages. It will be understood that Figure 1 is largely diagrammatic and does not disclose a finished physical embodiment. The arrangement and construction of various parts are susceptible of changes and modifications and I claim all such changes as come within the principle of the invention and the scope of appended claims.

I claim:

1. An exposure meter comprising in combination a casing, a fixed post centrally thereof and bearing a visible fixed index mark, a sleeve rotatably mounted on said post and bearing a visible diaphragm opening scale, means for rotating said sleeve to set the diaphragm opening scale with reference to the said fixed index mark to indicate diaphragm openings, a Scheiner scale on the outside of said casing, a member adjustably supported on the casing and bearing a mark for indicating the Scheiner index on the Scheiner scale, a disk mounted upon said casing to rotate around the said rotatable sleeve, said disk bearing a visible time exposure scale, means for rotating the disk to indicate time exposures with reference to the said Scheiner index mark, an annular resistance within the casing, contact members carried by the said sleeve and disk in contacting engagement with the resistance to vary the same in proportion to the extent of the rotative movements of the said sleeve and disk, a photoelectric cell and a galvanometer connected in series with the said resistance.

2. An exposure meter comprising in combination a casing, an annular variable resistance within the casing, a disk rotatably supported in said casing and bearing a visible diaphragm opening scale, means for rotating the disk with reference to a visible fixed mark on the casing for indicating diaphragm openings, a second disk rotatably supported in said casing and bearing a visible time exposure scale arranged in curved parallelism to the said diaphragm opening scale, a Scheiner scale on said casing, an adjustable mark on the casing for indicating the Scheiner index on the Scheiner scale, means for operating the second disk with reference to said adjustable mark to indicate time exposures, a photoelectric cell and a galvanometer connected to the said resistance by means of contact fingers carried by the said two disks for varying the said resistance in response to the operations of the said two scale bearing disks.

3. An exposure meter according to claim 1 characterized by that the said galvanometer is provided on its face with a time exposure scale and a corresponding diaphragm openings scale for light value outside the range of the exposure and opening scales on the said casing.

LUDWIG LEITZ.